United States Patent
Swartz et al.

[11] Patent Number: 5,980,217
[45] Date of Patent: Nov. 9, 1999

[54] PORTABLE COMPRESSOR HAVING SUPPORT LEG WITH FLEXIBLE JOINT

[75] Inventors: Charles A. Swartz; Dean P. Hendrix, both of Mocksville, N.C.

[73] Assignee: Ingersoll-Rand Company, Woodcliff Lake, N.J.

[21] Appl. No.: 08/890,379

[22] Filed: Jul. 11, 1997

[51] Int. Cl.⁶ .................................................. F04B 53/00
[52] U.S. Cl. .......................... 417/234; 403/229; 280/475
[58] Field of Search ............................. 417/234; 403/220, 403/229; 280/475, 765.1, 767

[56] References Cited

U.S. PATENT DOCUMENTS

| | | |
|---|---|---|
| 1,610,069 | 12/1926 | Weber . |
| 2,153,387 | 4/1939 | Newman ................................. 403/229 |
| 2,882,070 | 4/1959 | Bill . |
| 3,046,037 | 7/1962 | Cain ........................................ 280/475 |
| 3,343,858 | 9/1967 | Rice ........................................ 403/229 |
| 3,680,836 | 8/1972 | Amelotte et al. . |
| 4,635,904 | 1/1987 | Whittingham . |
| 4,969,631 | 11/1990 | Whittingham . |
| 5,230,499 | 7/1993 | Schneider . |
| 5,509,687 | 4/1996 | Thorndike . |
| 5,518,262 | 5/1996 | Hutchinson et al. .................... 280/475 |

FOREIGN PATENT DOCUMENTS

| | | | |
|---|---|---|---|
| 464565 | 4/1950 | Canada ................................ 280/766.1 |
| 1300365 | 7/1969 | Germany ................................ 403/229 |

Primary Examiner—Charles G. Freay
Assistant Examiner—Cheryl J. Tyler
Attorney, Agent, or Firm—Michael M. Gnibus

[57] ABSTRACT

A portable trailer movable over a surface, includes a frame and a support leg connected to the frame. The support leg has a flexible joint including a first support member, a second support member separate from the first support member and a flexible member spanning a gap between the first and second support members. The flexible member preferably joins the first and second support members so that said first and second support members are capable of moving into one or more non-parallel orientations relative to one another for preventing damage to the support leg when the support leg comes in contact with the surface or an object on the surface. The support leg may also include a second flexible joint.

10 Claims, 6 Drawing Sheets

PORTABLE COMPRESSOR HAVING SUPPORT LEG WITH FLEXIBLE JOINT

BACKGROUND OF THE INVENTION

The invention relates to a portable compressor transportable over a towing surface where the portable compressor includes a support leg, and more particularly the invention relates to a portable compressor having a support leg where the support leg includes a flexible joint for preventing damage to the support leg when the support leg comes in contact either with the towing surface, or with a stationary object located on the towing surface.

Rigid support legs sometimes referred to as jacks or prop legs are rigidly connected to the frame of a portable compressor and are used to support the front end of the compressor frame before and after the portable compressor frame is disconnected from a tow vehicle. Such support legs are a common feature in portable compressors and are usually provided with means for raising or swinging the support leg out of an extended support position while the compressor is being towed, to prevent the support leg from coming in contact with the towing surface or an object located on the towing surface. Frequently, compressor operators forget to raise or swing the support leg out of the extended support position before towing the compressor and as a result, the clearance between the support leg and the towing surface is not sufficient to prevent the support leg from being damaged by the towing surface or a stationary object on the towing surface.

A conventional portable compressor 10 that includes a prior art support leg 12 is shown in FIG. 1. The support leg is shown in greater detail in FIG. 2. Current portable compressors like the compressor shown in FIG. 1 and identified at 10, generally include a compression module 11 supported by frame 14 equipped with two wheels 15 for transporting the compressor 10 over a towing surface.

The support leg 12 is removably attached to the compressor frame 14 at the front end 16 of the frame by a pin connection 19 or by another conventional connection means. The support leg includes a first tubular member 18 that is removably connected to the frame 14, and a second tubular telescoping member 20 nested within the first tubular member. The first member 18 includes ends 21 and 23. Either wheel 22 shown in FIG. 1 or support pad 24 shown in FIG. 2 may be attached to the end of the second tubular member located outside of first member 18.

A nut 26 or other threaded member is fixed to the end of the second tubular member located in the hollow interior of the first tubular member 18 and threadably receives an elongate threaded member 28 which is rotated by a hand crank 30 operably connected to elongate threaded member 28. The elongate threaded member 28 extends through the second tubular member 20 into the interior of the second tubular member. See FIG. 2. Conventional bearing member 32 located along the threaded member 28 adjacent the hand crank 30, supports rotation of the hand crank. The bearing member may be any suitable bearing well known to one skilled in the art including a thrust bearing or bushing for example.

When the portable compressor 10 is delivered to a job site, the support leg second member 20 is extended to support the front end 16 of the compressor frame 14. The hand crank is rotated in a first direction to cause the nut and member 20 to move in a telescoping manner outward from member 18 along axis 17. The support leg is extended until the support pad or wheel is located on the towing surface.

When use of the portable compressor at the job site is completed, the second member 20 is retracted in a telescoping manner into the member 18 by rotating the hand crank in a second direction to cause the nut and member 20 to translate upward into member 18 along axis 17. The second member is retracted to provide sufficient clearance between the support leg wheel 22 or pad 24 and the towing surface as the compressor is towed to the next job site.

When the clearance between the support leg and towing surface is relatively small, and the support leg comes in contact with both stationary objects on the towing surface or the towing surface itself the support leg is usually damaged beyond repair since the support leg 12 is rigidly connected to the compressor frame 14 and does not include means for preventing damage to the support leg as a result of such contact.

Additionally, the compressor support leg may also be damaged at the job site. After the support leg has been extended, the compressor may roll or otherwise move from a stationary position at the job site and as the compressor moves, the support leg is frequently damaged by contact with the towing surface or an object or curb at the site.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a portable compressor movable over a towing surface, the portable compressor comprising: a frame, a compression module mounted on the frame, a support leg connected to the frame, the support leg including a flexible joint for preventing damage to the support leg when the support leg comes in contact with the towing surface or an object located on the towing surface.

In one preferred embodiment of the present invention a portable trailer movable over a surface, such as a portable trailer having a compressor mounted thereon, includes a frame and a support leg connected to the frame for supporting an end of the trailer. The support leg includes a flexible joint comprising a first support member, a second support member separate therefrom and a flexible member, such as a compressible coil spring, spanning a gap between the first and second support members. The flexible member preferably joins the first and second support members and enables the first and second support members to move into one or more non-parallel orientations relative to one another for preventing damage to the support leg when the support leg comes in contact with the surface or an object on the surface.

In certain embodiments, the support leg includes a first tubular member with a first end and a second end, whereby the flexible joint connects the support leg to the trailer frame between the first and second ends of the first tubular member. In other embodiments, the first support member of the flexible joint is integrally connected with the support leg, between the first and second ends of the first tubular member, and the second support member is connected to the frame.

The first and second support members preferably include opposing free ends that are adjacent one another. The first and second support members may also include flexible member retention means for securing the ends of the flexible member to the respective first and second support members.

The flexible member retention means may include an annular detent. In certain embodiments, the annular detents may be located between adjacent coils.

The flexible joint may be enclosed by a cover. In certain embodiments, the cover may include a first tubular portion engaging the first support member, a second tubular portion engaging the second support member and a plurality of bellows therebetween for joining the first and second tubular portions.

In other preferred embodiments of the present invention, a portable trailer movable over a surface includes a frame and a support leg connected to the frame, the support leg including a first leg member and a second leg member extendable and retractable relative to the first leg member. The second leg member preferably has a first flexible joint including first and second sections of the second leg member which are separate from one another and a flexible member spanning a gap between and preferably joining the first and second sections of the second leg member so that the first and second sections may move into one or more non-parallel orientations relative to one another for preventing damage to the support leg when the support leg comes in contact with the surface or an object on the surface. In these particular preferred embodiments, the portable trailer may also include a second flexible joint comprising a first support member integrally connected with the first leg member, a second support member connected to the frame, and a flexible member spanning a gap between and joining the first and second support members.

The foregoing and other aspects will become apparent from the following detailed description of the invention when considered in conjunction with the accompanying drawing figures.

BRIEF DESCRIPTION OF THE DRAWING FIGURES

DESCRIPTION OF THE PREFERRED EMBODIMENTS

Figure 1:
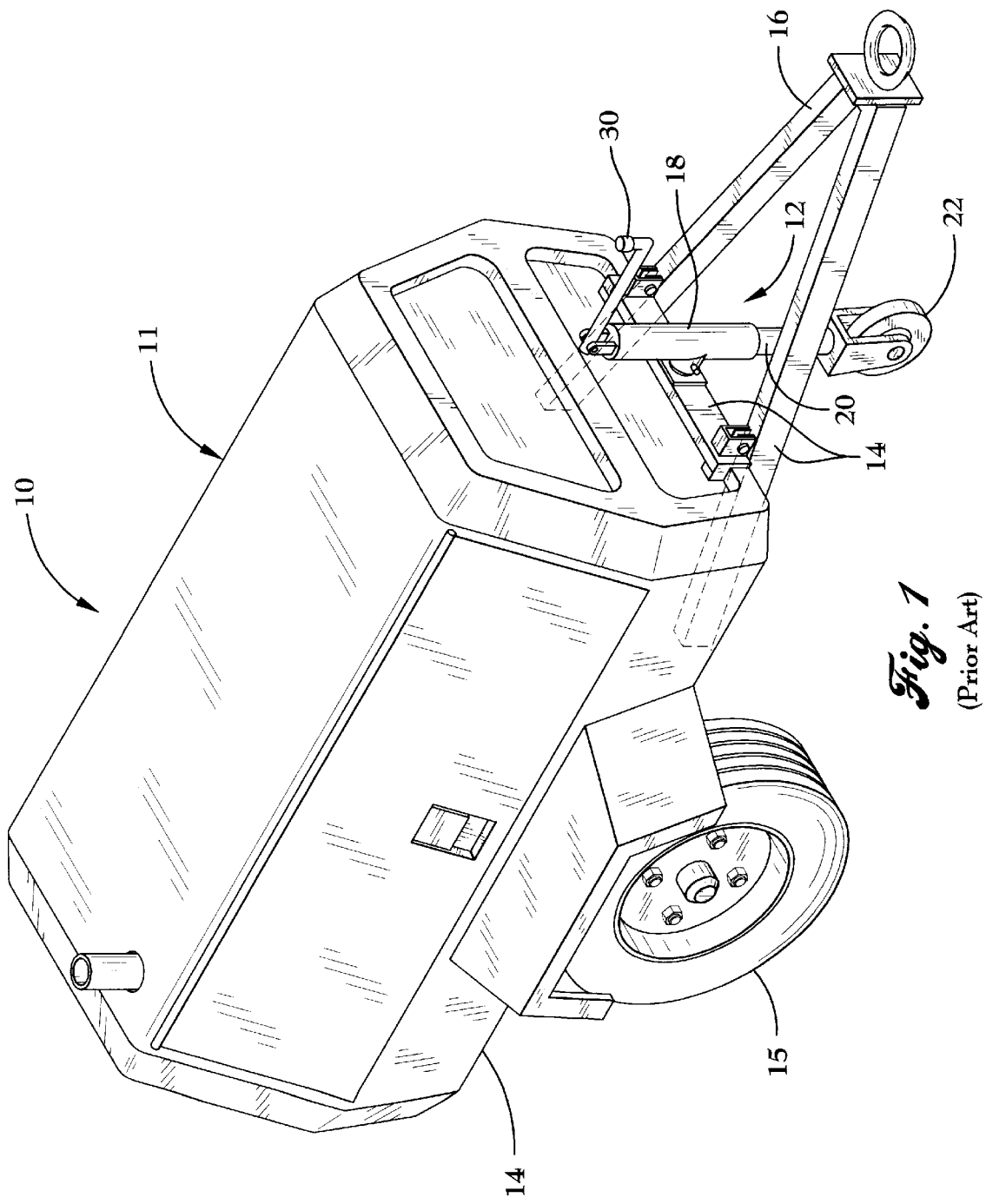
FIG. 1 is an isometric view of a portable compressor that includes a conventional support leg.
Figure 2:
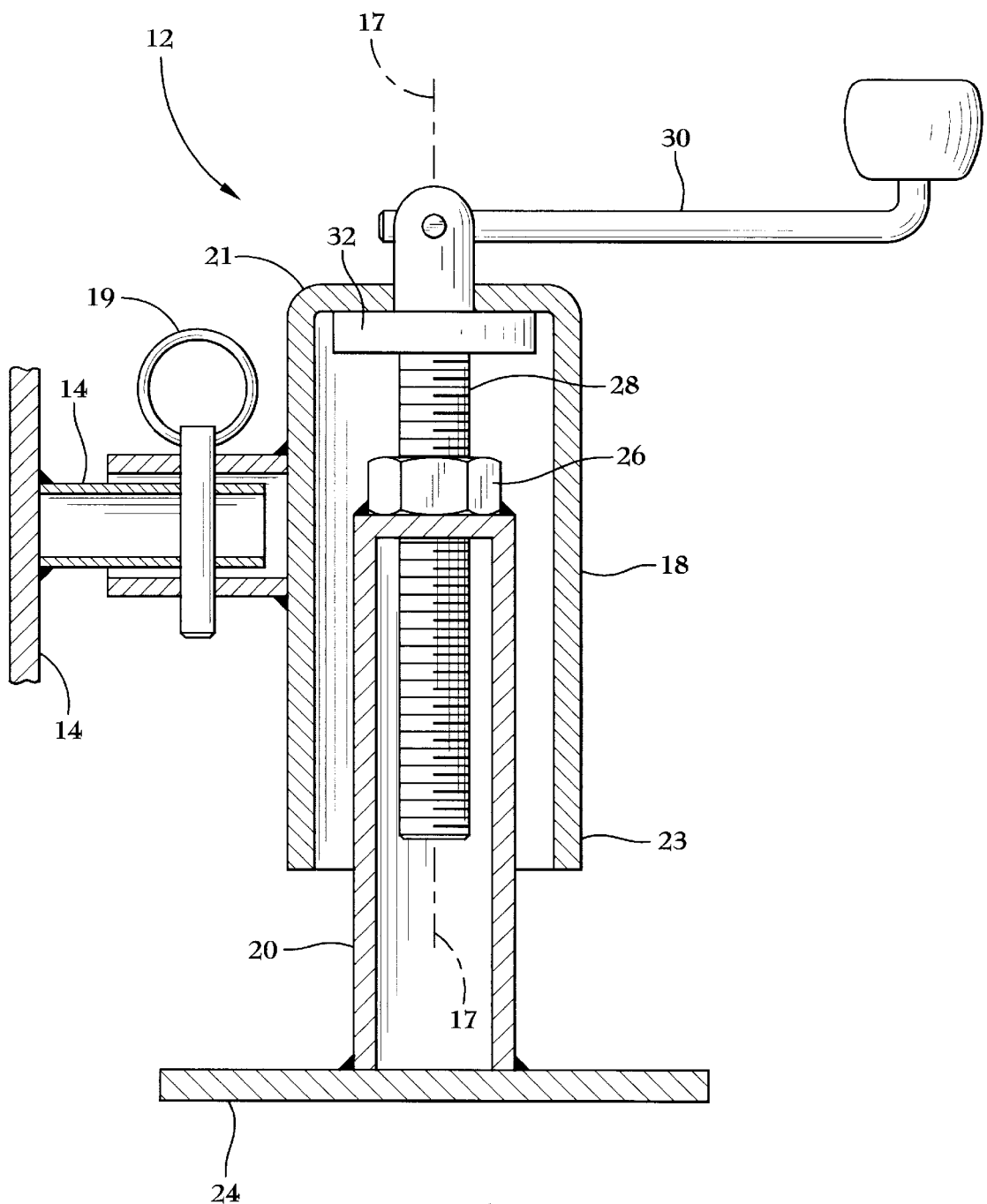
FIG. 2 is a longitudinal sectional view of the conventional support leg of the compressor shown in FIG. 1.
Figure 3:
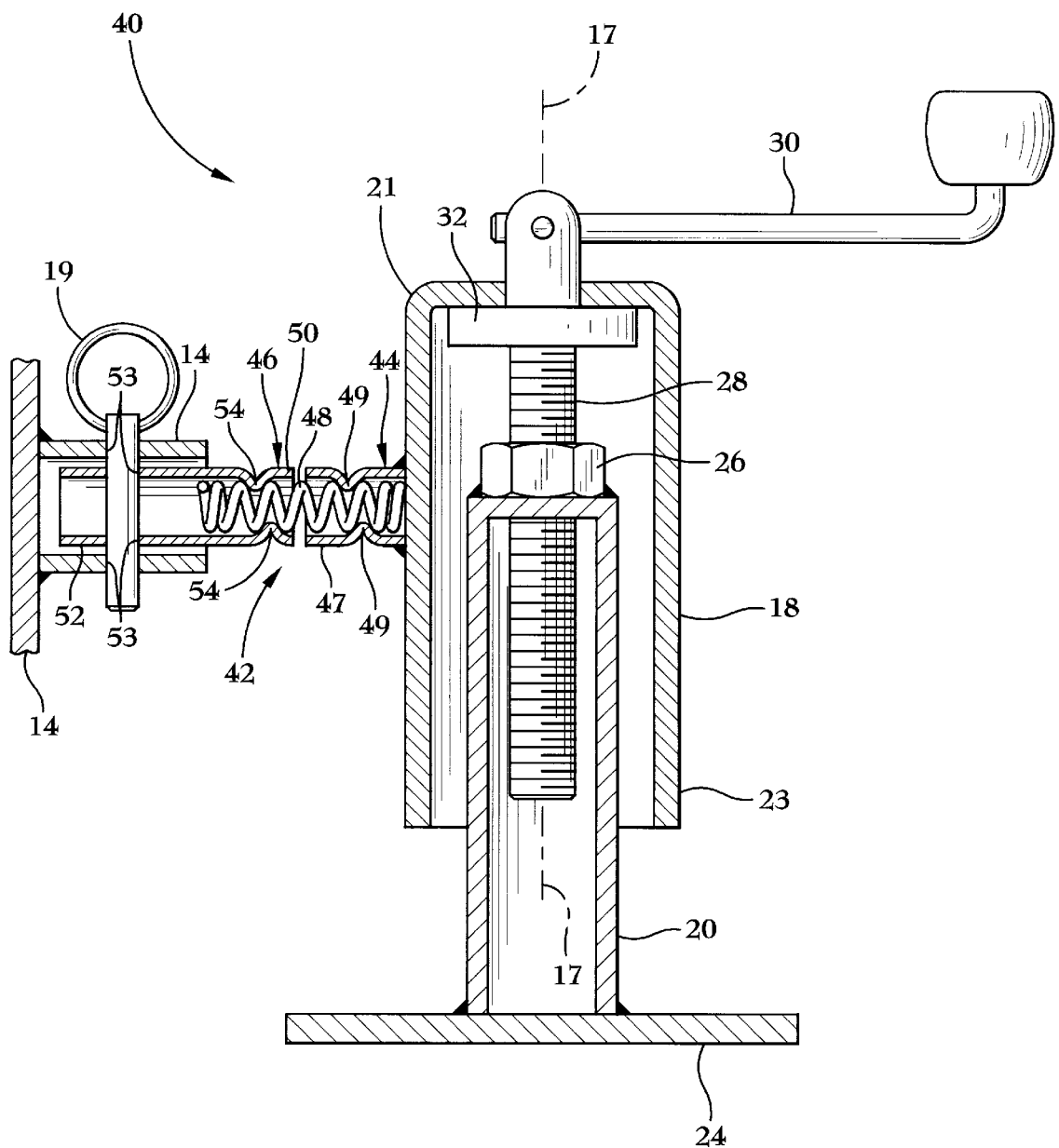
FIG. 3 is a longitudinal sectional view of a first embodiment support leg of the present invention.
Figure 4:
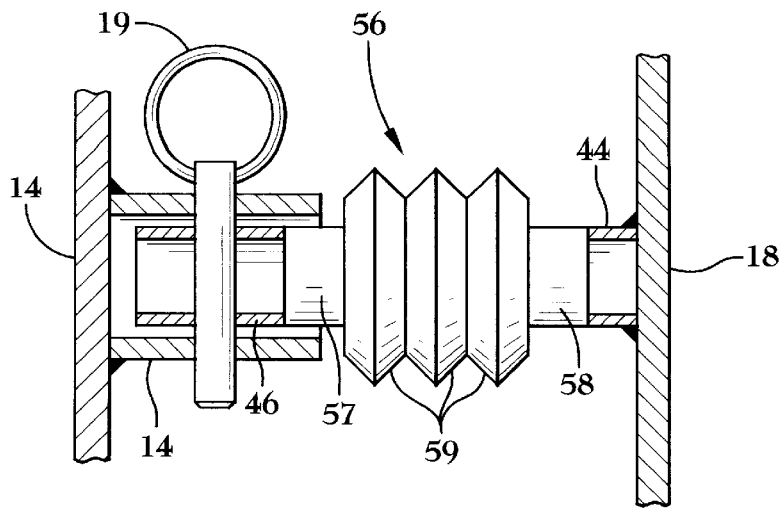
FIG. 4 is an enlarged view of a portion of the support leg of FIG. 3 showing a protective cover for the support leg flexible joint.

Turning now to the drawings wherein like parts are referred to by the same number throughout the several views, FIGS. 3 and 4, illustrate a first embodiment support leg 40 of the present invention. The first embodiment support leg may be used to support a portable machine like portable compressor 10 wherein the compressor includes a towable frame 14, and a compression module 11 mounted on the frame. The support leg 40 is removably connected to the frame at the frame end 16 by a pin connection 19 or any other suitable removable connection member including but not limited to a bolt or screw.

It should be understood that the term "support leg" as used herein generally refers to the class of devices including jacks, prop legs and stands which may support frame 14 for transporting a machine and should not be limited only to the support leg illustrated in the Figures.

As shown in FIGS. 3 and 4, the first embodiment support leg 40 includes the first member 18, second member 20, support pad 24, nut 26, elongate member 28, hand crank 30, and bearing member 32 in the same configuration and for the same use as previously described in detail in the description of support leg 12 hereinabove. Therefore, further detailed description of these elements is not required.

In addition to the elements previously described, support leg 40 includes a flexible joint 42 having a first support member 44 made integral with tubular member 18 between ends 21 and 23, discrete second support member 46 and flexible member 48 that joins the first and second support members as shown in FIG. 3. For purposes of describing the first preferred embodiment of the invention, the flexible member is a closed end coil spring however, it should be understood that the flexible member may be any suitable flexible member that prevents damage to the support leg as a result of contact with the towing surface or a stationary object by causing the support leg to be flexed out of the vertical orientation shown in FIG. 3 when it strikes an object or the towing surface.

Unitary cylindrical first support member 44 is made integral with the first tubular member 18 between ends 21 and 23 by a weld connection or other suitable connection means, and the support member extends away from member 18 and terminates at a free end 47. Flexible member retention means 49 is provided along the inner wall of the support member 44. The retention means is a detent that extends annularly along the inner wall, however, the detent may also be a bolt, rivet, screw or other fastener that may extend through the support member to capture the flexible member 48 in place in support member 44. The detent is located between adjacent coils of spring 48 to inhibit movement of the end of the spring 48 outward from the first support member.

The second support member 46 has a first free end 50 adjacent free end 47 and a second free end 52 located within the hollow interior of frame anchor member 14. Pin connection 19 is passed through aligned openings 53 formed in frame 14 and the end 52 of support member 46 to thereby connect the support leg 40 to compressor frame 14.

Flexible member retention means 54 is formed along the inner wall of support member 46, and like retention means 49, retention means 54 is an annular detent adapted to be located between adjacent coils of flexible member 48 to hold the flexible member in place in the support member 46. Detent 54 may be a bolt, rivet, screw or other fastener which may be passed through member 46 to capture the end of member 48 in support member 46.

FIG. 4 is an enlarged view of flexible joint 42 showing a substantially tubular protective sleeve or cover 56 enclosing the flexible joint. A first sleeve end 57 is adapted to be fitted around second support member 46, a second sleeve end 58 is adapted to be fitted around first support member 44 and the first and second sleeve ends are joined by a plurality of bellows 59. Any number of bellows may be used to join the sleeve ends. The bellows give the protective cover the flexibility and durability required to withstand flexing of flexible joint 42.

In order to assemble leg 40, the end 52 is located in frame 14 and after aligning openings 53, the pin 19 is passed through the aligned openings 53. Then end 57 of the cover 56 is fitted around support member 46 so that the bellows surround free end 50. Flexible member 48 is inserted into support member 44 and is locked in place by engaging adjacent spring coils with detent 49. The opposite end of member 48 is inserted into support member 46 and is locked in place by detent 54 as adjacent coils of spring 48 engage the detent 49. As the member 48 is inserted into member 46, the end 58 of cover 56 is fitted around the exterior of support member 44.

By the flexible joint 42, the support leg is provided the flexibility required to prevent damage to the support leg when it engages the towing surface or a stationary object during towing.

Figure 6:
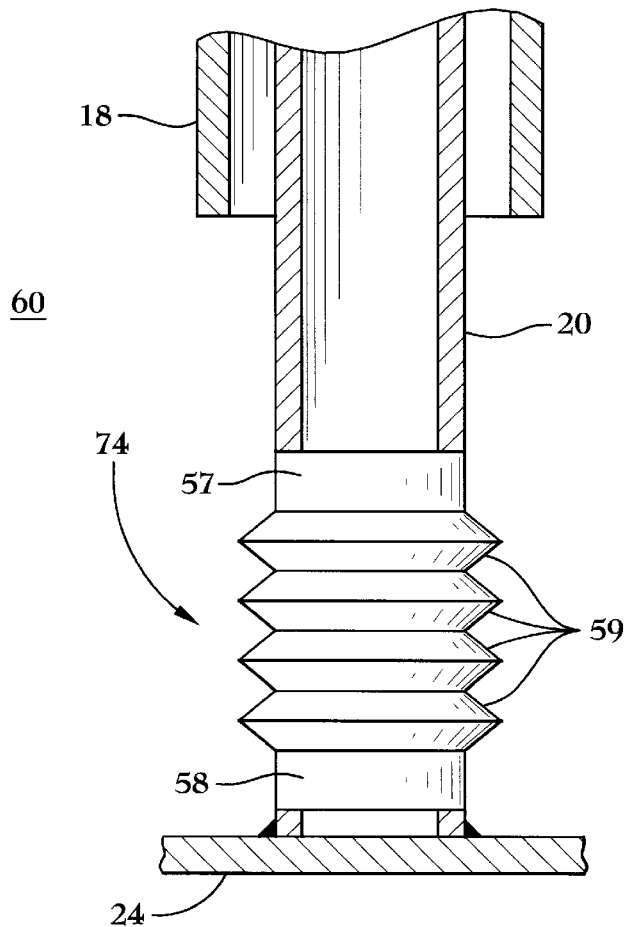
FIG. 6 is an enlarged view of a portion of the support leg of FIG. 5 showing a protective cover for the support leg flexible joint.
Figure 5:
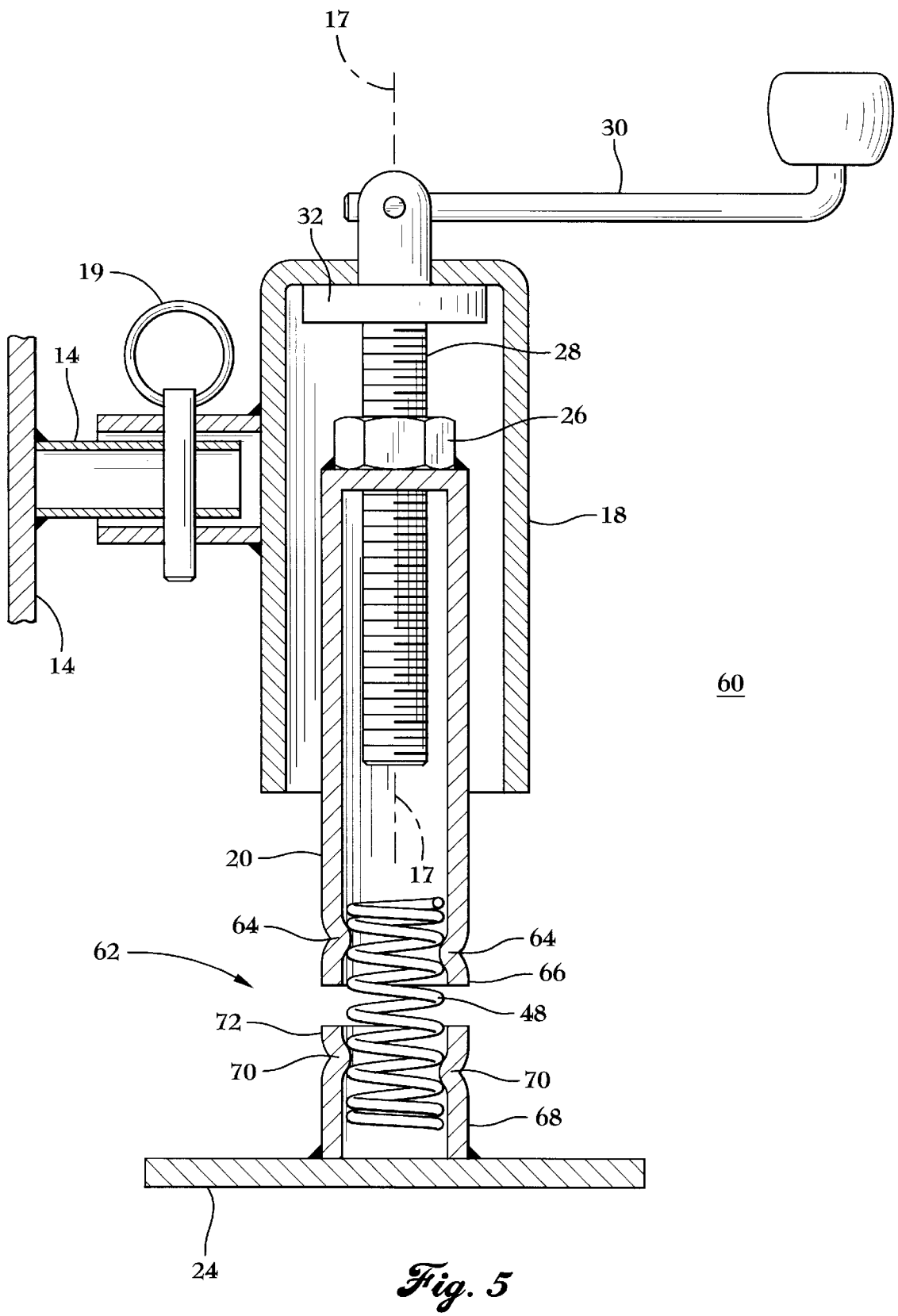
FIG. 5 is a longitudinal sectional view of a second embodiment support leg of the present invention.

FIGS. 5 and 6 illustrate a second embodiment support leg 60 of the present invention. The second embodiment support leg includes the first and second members 18 and 20, support pad 24, nut 26, threaded member 28, hand crank 30 and bearing 32 described in detail in the description of prior art support leg 12 hereinabove. Therefore, further description of these elements in not required.

The second embodiment support leg 60 includes a flexible joint 62 that is comprised of second tubular member 20, support member 64 and flexible member 48 which is the same coil spring described in the first embodiment support leg 40. Flexible member retention means 64 is provided along the inner wall of member 20 near free end 66 and is comprised of an annular detent like detents 49 and 54. Flexible joint 62 causes the lower end of the support leg to flex when the leg comes in contact with the towing surface or an object on the towing surface.

A support member 68 is made integral with pad 24. Flexible member retention means 70 which is an annular detent like detent 64 is formed along the inner wall of the hollow support member. The support member terminates at free end 72. The ends of the flexible member 48 are inserted into the second end of member 20 and the support member 70 until the detent is located between a pair of adjacent coils and thereby captures the member 48.

Turning to FIG. 6, a protective cover or sleeve 74 like sleeve 56 encloses the flexible joint with one sleeve end fitted around support member 70, the second sleeve end fitted around second member 20 and the plurality of bellows 59 which join the sleeve ends surrounding the ends 66 and 70 and flexible member 48. In the second preferred embodiment four bellows 59 are disclosed however any suitable number of bellows may join the sleeve ends.

Figure 7:
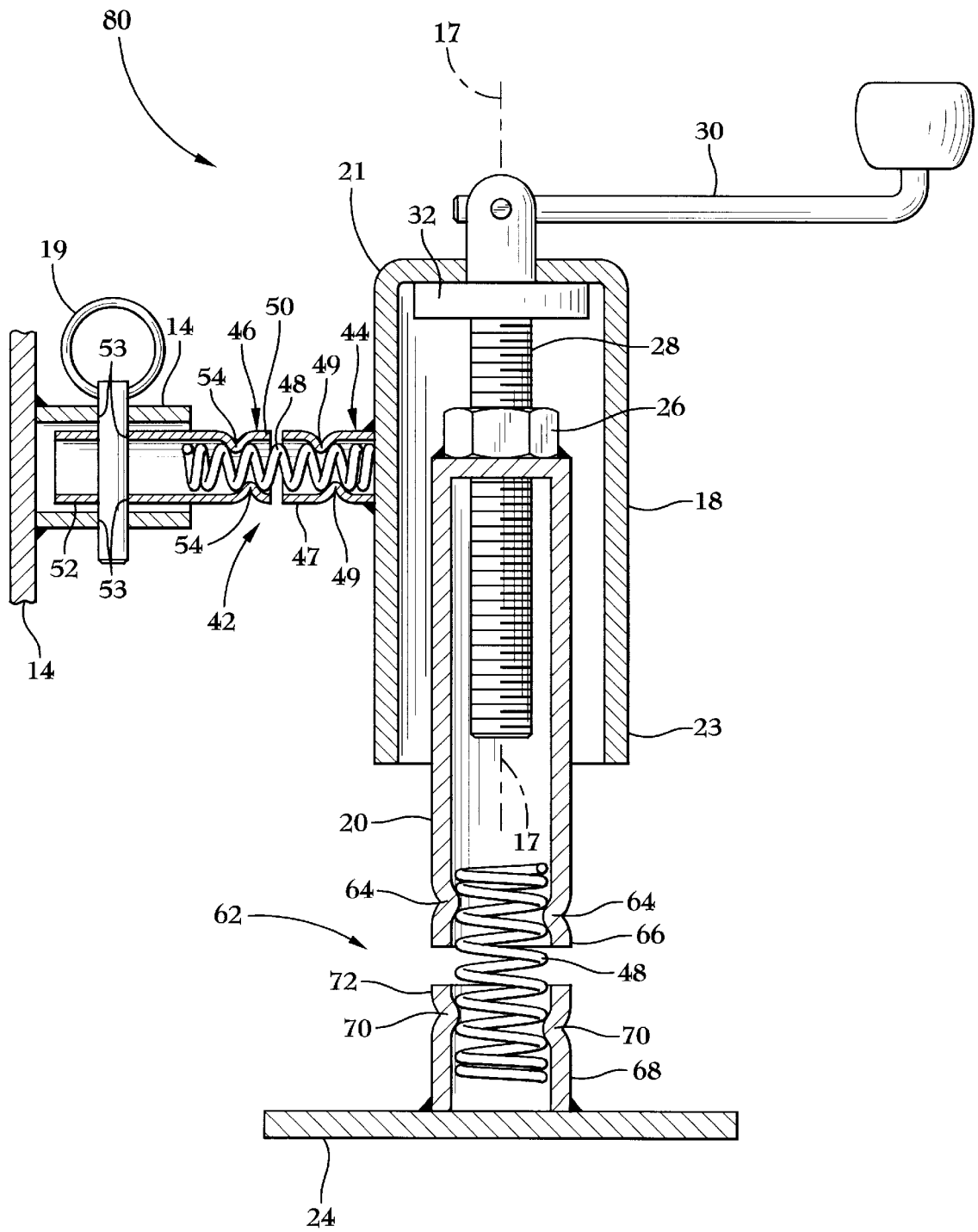
FIG. 7 is a third embodiment support leg that includes in combination the flexible joints of the first and second embodiment support legs.

FIG. 7 illustrates a third embodiment support leg 80 which includes both flexible joints 42 and 62 previously described hereinabove. The third embodiment support legs may also be protected by covers 56 and 74 previously described.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

Having described the invention, what is claimed is:

1. A portable trailer movable over a surface, the portable trailer comprising: a frame and a support leg connected to the frame, the support leg including a first flexible joint comprising a first support member, a second support member separate therefrom and a first flexible member spanning a gap between said first and second support members; the trailer further comprising a second flexible joint comprising a third support member integrally connected with the support leg, a fourth support member connected to the frame, and a second flexible member spanning a gap between third and fourth support members of the second flexible joint, wherein said first and second support members move into one or more non-parallel orientations relative to one another and said third and fourth support members move into one or more non-parallel orientations relative to one another, for preventing damage to the support leg when the support leg comes in contact with the surface or an object on the surface.

2. The portable trailer as claimed in claim 1, wherein the first flexible member includes a first spring joining said first and second support members and the second flexible member includes a second spring joining said third and fourth support members.

3. The portable trailer as claimed in claim 2, wherein the spring includes a coil spring.

4. The portable trailer as claimed in claim 1, wherein the first and second support members include flexible member retention means for securing opposing ends of a said flexible member to respective said first and second support members.

5. The portable trailer as claimed in claim 4, wherein the flexible member retention means includes an annular detent.

6. The portable trailer as claimed in claim 5, wherein the flexible members include a spring having a plurality of coils located side by side, said annular detent being located between adjacent coils.

7. The portable trailer as claimed in claim 1, wherein at least one of the flexible joints is enclosed by a cover.

8. The portable trailer as claimed in claim 7, wherein the cover includes a first tubular portion engaging the first support member, a second tubular portion engaging the second support member and a plurality of bellows therebetween for joining the first and second tubular portions.

9. The portable trailer as claimed in claim 1, wherein the portable trailer includes a compressor mounted atop said frame.

10. A portable trailer movable over a surface, the portable trailer comprising: a frame and a support leg connected to the frame, the support leg including a first leg member and a second leg member extendable and retractable relative to the first leg member, said second leg member having a first flexible joint comprising first and second sections of said second leg member which are separate from one another and a flexible member spanning a gap between said first and second sections of said second leg member; the trailer further comprising a second flexible joint comprising a first support member integrally connected with the first leg member, a second support member connected to the frame, and a flexible member spanning a gap between first and second support members, wherein said first and second sections move into one or more non-parallel orientations relative to one another for preventing damage to the support leg when the support leg comes in contact with the surface or an object on the surface.

* * * * *